Oct. 29, 1957  J. REED  2,811,356
EDUCATIONAL AMUSEMENT DEVICE
Filed Sept. 15, 1953
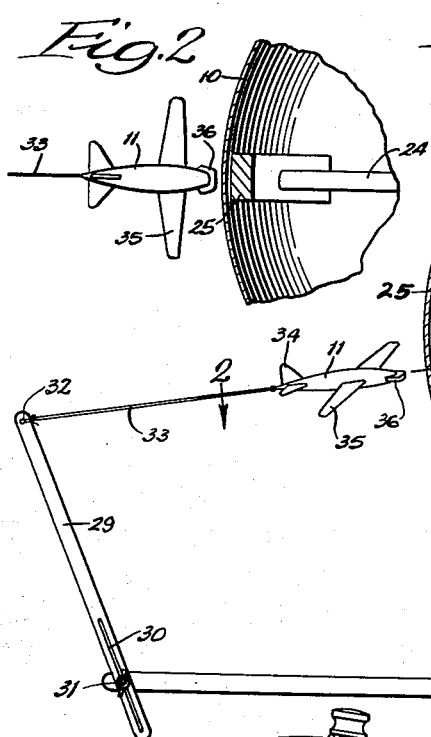
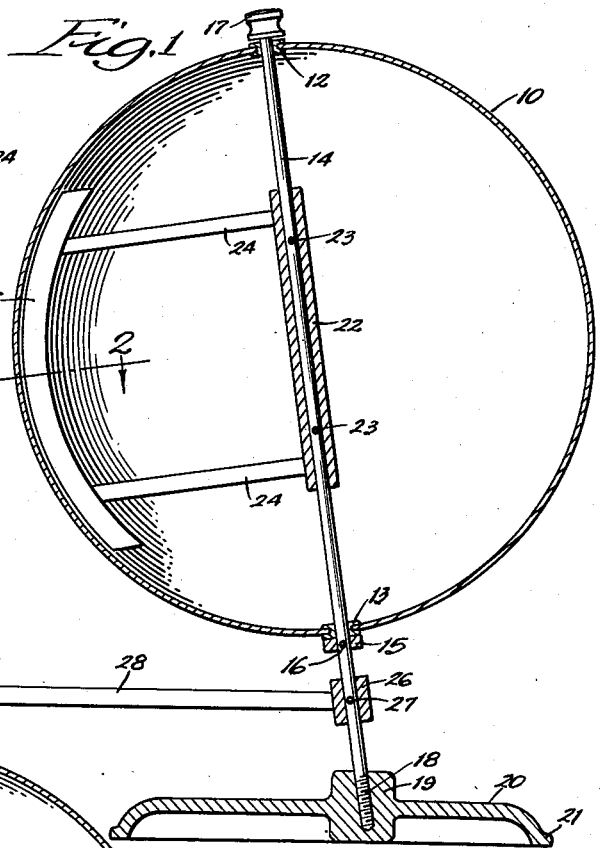
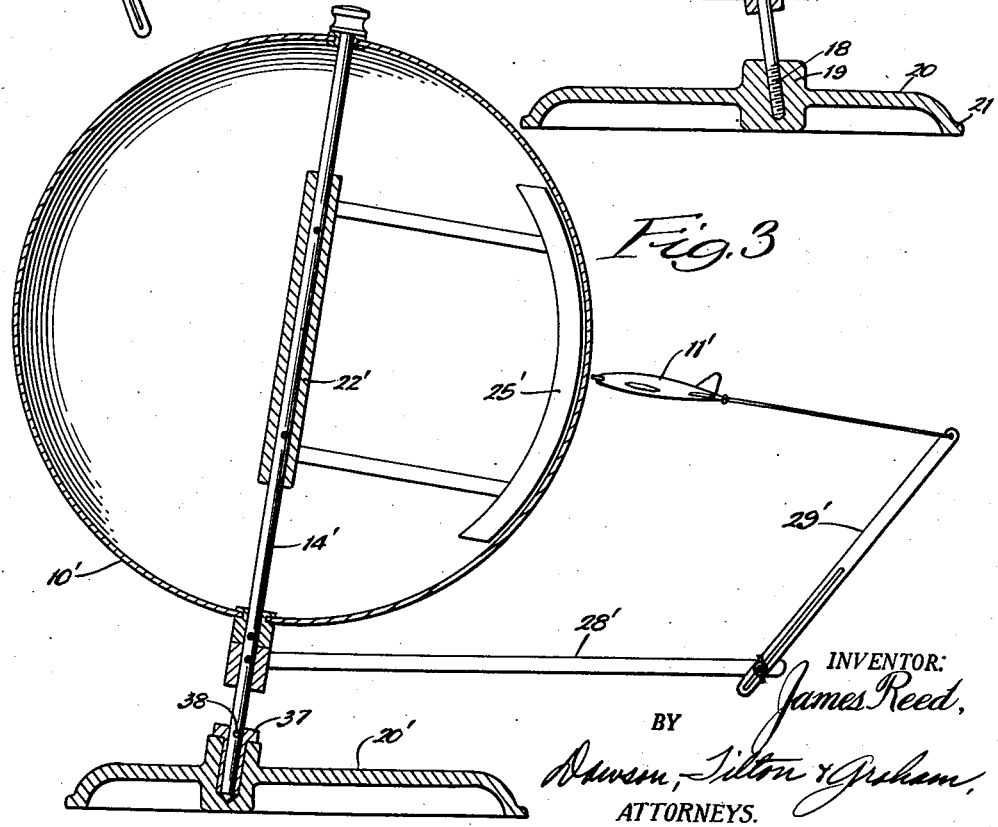
INVENTOR:
James Reed,
BY
Dawson, Tilton & Graham,
ATTORNEYS.

United States Patent Office 2,811,356
Patented Oct. 29, 1957

2,811,356

EDUCATIONAL AMUSEMENT DEVICE

James Reed, Chicago, Ill.

Application September 15, 1953, Serial No. 380,173

2 Claims. (Cl. 272—8)

This invention relates to an educational amusement device and, more particularly, to a globe and magnet pointer device in which the pointer is adapted to be directed toward selected positions on the globe.

There are a number of instances where a device having characteristics that attract and hold the attention of individuals may be utilized desirably. Even more advantageous would be a device wherein the very means used to attract and thereafter hold the attention of a person could be manipulated as desired to concentrate the attention of the individual at a particular area or selected point on the device.

I have provided such an apparatus and while the applications of the invention are numerous, the invention will be described with special reference to a globe that is representative of the world and is provided about the peripheral surface thereof with a map of the world thereon. Globes of this character are quite common and well known. My invention in this setting would be effective, for example, in stimulating the interest of children in geography and at the same time would be entertaining.

It is accordingly an object of this invention to provide a device that will stimulate interest and attract attention and that can be utilized as an educational medium. Another object of the invention is to provide a device wherein a magnet provides a member of attraction and a member that is attracted is arranged therewith and is the subject of the magnetic attraction provided by the magnet, but is held from contact with the attraction member and thereby gives the appearance of being suspended in midair. Still another object of the invention is to equip a globe that is representative of the world with an interior magnet and provide a simulated plane that is anchored in spaced relation with the globe by a thin thread; the plane having at least a portion thereof formed of magnetic material and the thread being operative to permit the plane to be brought within the magnetic field adjacent the globe while holding it in spaced relation with the globe so that the plane appears to hover in space near the surface of the globe. A further object is in providing in such a structure an elongated bar magnet that is arcuate and follows the curvature of the globe within which it is mounted to provide a means for positioning the simulated plane selective at a number of points along the globe. Yet a further object is in providing a globe that is rotatable relative to the magnet and the simulated plane so that various points on the globe map may be interposed between the magnet and plane. Still a further object is to provide a structure in which the globe, plane, anchor and magnet are all movable about a common axis. Additional objects and advantages will appear as the specification proceeds.

Embodiments of the invention are illustrated in the accompanying drawing, in which—

Fig. 1 is a vertical sectional view taken through the center of a device embodying my invention; Fig. 2 is a broken transverse sectional view taken on the line 2—2 of Fig. 1; and Fig. 3 is a vertical sectional view similar to that of Fig. 1, but showing a modification.

In its simplest form, the structure includes a magnet that provides a member of attraction and an attracted member or pointer member that is attracted toward the magnet but is held in spaced relation therewith by a collapsible thread that is anchored at a point spaced from the magnet. The attracted member is brought into the magnetic field provided by the magnet but is prevented from contacting the magnet by the string. The attracted member appears to be flying toward the magnet or to be hovering in space away from the magnet, and the usual air movements within a room, etc. tend to flutter the attracted member and in the event that it is in the form of a simulated airplane, as illustrated in the drawing, this member appears to be flying toward the magnet.

This basic structure may be embodied in a number of different arrangements. The refinement I prefer is illustrated in the drawings and consists of a globe 10 that may be referred to generally as the member of attraction since the simulated plane 11 appears to be flying toward the globe. The globe 10 is equipped with bearing members 12 and 13 that are rotatably received upon an axis or support shaft 14. To determine the axial position of the globe 10 upon the axis 14, a collar 15 is provided adjacent the lower surface of the globe and is pinned at 16 to the axis and provides an abutment upon which the globe rests. At its upper end, the axis or shaft 14 may be threaded and threadedly receives a cap or knob 17. The axis 14 is threaded at its lower end 18 and is threadedly received within a hub 19 provided by a base 20 having a depending anchor edge 21 adapted to provide a footing for the base upon a table or other rigid support member.

The structure so far described is, for the most part, conventional, and is found in the usual globe that can be purchased in most department stores. These globes are rotatable about a shaft extending therethrough and the shaft or rotational axis is generally angularly oriented so that the position of the world in space is fairly accurately represented. The globe 10 may be formed from many different materials. Preferably the material selected is non-magnetic and desirably is non-metallic. Usually the globes are formed of paper or plastic, etc., and these are desirably used with my structure for they afford little diminution of the magnetic field provided, as will be subsequently described. Since globe structures of this character are well known, it is believed unnecessary to go into a more detailed discussion and description thereof.

Upon the shaft 14 and within the globe 10 a sleeve 22 is secured to the shaft by spaced pins or set screws 23. Rigidly carried by the sleeve 22 are spaced-apart arms 24 that may be secured to the sleeve by any suitable means and carry at their outer ends an elongated bar magnet 25 that is formed with a curvature so that it follows the curvature of the globe 10, as is apparent in both Figs. 1 and 3. Preferably, the arms 24 are non-magnetic and desirably are non-metallic. These arms may be secured to the magnet 25 in any suitable manner, and should provide a rigid mounting therefor.

While an arcuate bar magnet is illustrated, it should be understood that the magnet 25 may take any desired and appropriate form. For example, a horseshoe magnet may be just as readily used and the north and south poles of the horseshoe magnet may be either spaced apart by a considerable distance or brought close together. A permanent magnet may be used or, if desired, the magnet may be electric although this will complicate the structure somewhat. Further, the magnet may be oriented in any desired way and may extend along the rotational axis 14 in the manner illustrated in Figs. 1 and 3, or the magnet may be turned so as to extend longitudinally along the surface of the globe 10. Any other positioning of the magnet may be used, and the length of the magnet may be short, or it may be long and extend from the upper point of the axis 14 to the lower point thereof.

Pinned to the shaft 14 below the globe 10 is a collar 26. Any means of securing the collar to the shaft may be used, such as the pin 27 illustrated. Rigidly carried by the collar 26 is an elongated arm 28 having pivotally secured to the outer end thereof an extension arm 29 provided with an elongated slot 30 at one end thereof. The elongated slot 30 permits the arm 29 to be adjusted for length, since this enables it to slide along the bolt and wing nut arrangement 31 that extends through the arm 28 and the slot 30 and provides the pivotal mounting for the extension arm 29.

At its upper end the extension arm 29 is provided with an aperture 32 therethrough, and a thin string or thread 33 is passed through the aperture and is tied to the end of the extension arm 29. At its other end, the thread 33 is connected to the simulated plane 11 at one end thereof. By referring to Fig. 3 it is seen that the plane 11 is equipped with a hooked end portion that receives the thread 33.

Preferably, the thread 33 is thin and is chosen to have a dark color so that it is not readily visible. The thread may be formed of many different materials and appropriately used are the threads used in sewing, or thin binding twine, etc. The thread 33 should be collapsible or flexible so that it is incapable by itself of supporting the weight of the plane 11.

While a plane 11 is shown in the drawing, it provides the member attracted by the magnet 25 and may take on any desired physical configuration. A simulated plane is chosen because it readily gives the appearance of flight toward the surface of the globe 10. The plane 11 may have the usual tail structure 34 and wing structure 35. Any material may be used to form the plane 11, but I prefer to use a material that is non-metallic or non-magnetic and to equip the plane at one point thereof, such as the nose portion, with a member 36 that is subject to magnetic attraction so that this particular point on the plane will be directed toward the magnet and globe 10. For example, the plane may be made of plastic, paper, light wood such as balsa wood, etc. The plane could, however, be formed in its entirety from a metal such as thin sheet steel that would be light in weight and subject to magnetic attraction of the magnet 25, but in such case it would be difficult to orient just the nose or just the wing tip, etc., as the case might be, toward the magnet 25. It will be appreciated that the member 36 may be carried at any selected point upon the plane 11.

In the modification of the structure illustrated in Fig. 3, the globe, magnet, plane, and arms that provide the anchor for the plane, are all identical with the structure shown in Fig. 1 and heretofore described and are given the same numerical designation except that a prime has been added to each number to indicate the modification. In the modification, however, the shaft 14' is not rigidly carried in the hub of the base 20', but instead is rotatably carried therein upon a sleeve bearing 37 that is rigidly secured to the shaft by a pin 38. Thus, not only is the globe 10' rotatable about the shaft 14', but the entire shaft, globe, and arm members 28' and 29' may all revolve upon rotation of the shaft 14' within the base 20'.

*Operation*

In operation of the structure, the extension arm 29 is adjusted relative to the elongated arm 28 so that the angular orientation and the length thereof are chosen as desired. The simulated plane 11 is then picked up and is brought toward the surface of the globe 10 and the movement toward the globe is continued until the metallic nose 36 of the plane is well within the magnetic field of attraction provided by the magnet 25. The most simple way to achieve the adjustment is to bring the nose of the plane into contact with the surface of the globe at the point desired and the magnet 25 will hold the plane at this position. The nut and bolt arrangement 31 may then be loosened to enable the extension arm 29 to be pivoted and the arm is carefully moved rearwardly to tension the thread 33 and to draw the plane 11 away from the surface of the globe 10. When the nose of the plane is spaced slightly from the surface of the globe as is indicated in Figs. 1 through 3, the bolt and nut arrangement 31 may be tightened so that the plane will be held in this position.

Thusly suspended, the plane appears to be flying toward the globe and the appearance of flight is enhanced because the usual air movement within a room is sufficient to cause a slight flutter of the plane 11 and thus the slightly unsteady flight of a plane through the air is approximated.

In the structure shown in Fig. 1, the globe 10 may be rotated to bring any selected point on the map carried by the globe in front of the nose of the plane. With the elongated bar magnet the plane will be attracted thereto at any point along the surface of the magnet and if it is desired then to raise or lower the plane to change the point at which it is approaching the globe, the extension arm 29 is raised or lowered as required to accomplish this change of setting.

In the modification of Fig. 3 the structure and function thereof are substantially the same as that of the structure shown in Fig. 1, except that in addition to the globe 10' being rotatable about the axis 14', the axis itself is rotatable so that the arms 28' and 29' and plane 11' can be made to circle the globe. In this particular structure, an attractive representation of flight could be provided by securing the magnetic member 36 to a wing tip and the plane would then appear to be flying along the surface of the globe when the shaft 14 was rotated.

While in the foregoing specification embodiments of the invention have been set out in considerable detail for purposes of illustration, it will be apparent to those skilled in the art that deviations from these details may be made without departing from the spirit and principles of the invention.

I claim:

1. In a globe and magnet structure, a base, a shaft rotatably carried by said base and extending upwardly therefrom, a globe rotatably mounted upon said shaft with the peripheral surface thereof characterized by a map face representative of the earth's geography, a magnet rigidly carried by said shaft within said globe, support arm structure carried by said shaft between said base and globe and providing an anchor spaced outwardly from said globe, a plane having at least a portion thereof formed of magnetic material, and a thread secured at one end to said arm structure at said anchor and at the other end to said plane for constraining movement of the plane toward said globe, which results from the influence of said magnet, to hold the plane at a spaced distance from the globe but within the field of magnetic attraction provided by said magnet.

2. In combination with a globe characterized by having a non-magnetic map surface representative of the earth's geographical configuration, an anchor member having an arm spaced from the outer surface of said globe and being supported for rotary movement thereabout, a rotatable shaft extending into said globe along the axis thereof, a magnet carried by said shaft and being supported within said globe adjacent the surface thereof, means for rotating said shaft and said arm in synchronism, a relatively lightweight toy replica of an air ship having at least a portion thereof formed of magnetic material whereby it is attracted toward said globe by said magnet therein, and a thin thread secured to said arm and to said toy replica for limiting the movement thereof toward said globe at a point spaced therefrom but within the field of magnetic attraction established by said magnet.

References Cited in the file of this patent
UNITED STATES PATENTS

| | | | |
|---|---|---|---|
| 834,707 | Bradshaw et al. | Oct. 30, | 1906 |
| 1,070,546 | Sherlock et al. | Aug. 19, | 1913 |
| 2,323,837 | Neal | July 6, | 1943 |
| 2,669,800 | Dietrich | Feb. 23, | 1954 |
| 2,702,191 | Lemelson | Feb. 15, | 1955 |